United States Patent
Cai et al.

(10) Patent No.: US 7,178,815 B2
(45) Date of Patent: Feb. 20, 2007

(54) STABILIZER BAR INTEGRATED END LINK

(75) Inventors: Haimian Cai, Ann Arbor, MI (US); Xi Lin, Northville, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 335 days.

(21) Appl. No.: 10/641,769

(22) Filed: Aug. 14, 2003

(65) Prior Publication Data

US 2005/0035566 A1   Feb. 17, 2005

(51) Int. Cl.
    *B62D 21/055* (2006.01)

(52) U.S. Cl. .............................. 280/124.107; 280/93.511

(58) Field of Classification Search ......... 280/124.107, 280/93.511, 124.13, 124.137, 124.152; 403/122, 403/131
See application file for complete search history.

(56) References Cited

U.S. PATENT DOCUMENTS

| | | | |
|---|---|---|---|
| 5,064,216 A | | 11/1991 | Hynds |
| 5,102,160 A | | 4/1992 | Stowe |
| 5,186,486 A | * | 2/1993 | Hynds et al. .......... 280/124.107 |
| 5,501,421 A | * | 3/1996 | Kluting .................. 248/288.31 |
| 5,702,121 A | | 12/1997 | Song |
| 5,707,073 A | * | 1/1998 | Stuker et al. ............. 280/89.11 |
| 5,788,264 A | | 8/1998 | Adkins et al. |
| 5,876,148 A | | 3/1999 | Kraps |
| 6,007,079 A | | 12/1999 | Kincaid et al. |
| 6,007,080 A | | 12/1999 | Kincaid et al. |
| 6,019,383 A | | 2/2000 | Kociba et al. |
| 6,076,840 A | | 6/2000 | Kincaid et al. |
| 6,254,114 B1 | | 7/2001 | Pulling et al. |
| 6,257,602 B1 | * | 7/2001 | Joerg et al. ............. 280/93.514 |
| 6,363,613 B1 | * | 4/2002 | Wolf et al. ............... 29/896.91 |
| 6,851,688 B2 | * | 2/2005 | Barry ....................... 280/93.51 |
| 2002/0109325 A1 | | 8/2002 | Purick |

* cited by examiner

*Primary Examiner*—David R. Dunn
(74) *Attorney, Agent, or Firm*—MacMillan, Sobanski & Todd, LLC

(57) ABSTRACT

A stabilizer bar for an automotive vehicle is provided having an end link mounted to at least one end thereof. One end of the end link includes a bore in which is received a spherical bearing, such that forces transferred directly from the stabilizer bar to the end link are transferred through the spherical bearing. The second end of the end link is adapted to connect to a component of the vehicle's suspension system.

12 Claims, 5 Drawing Sheets

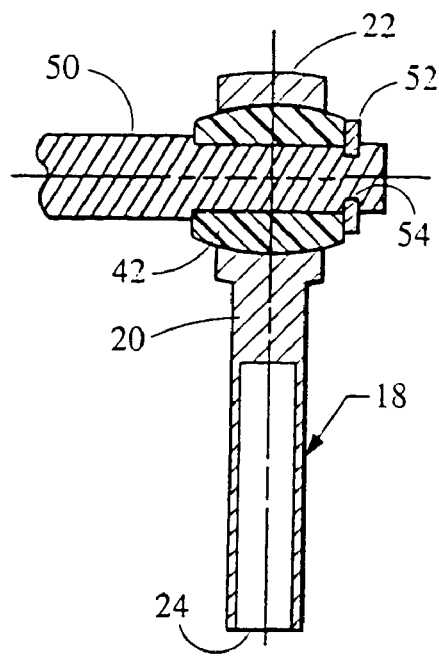
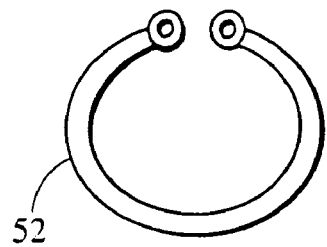
Fig. 5
Fig. 6
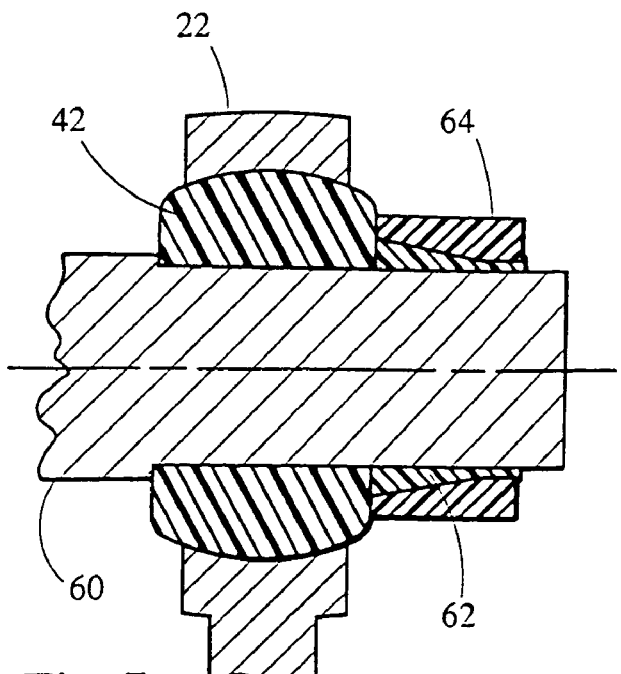
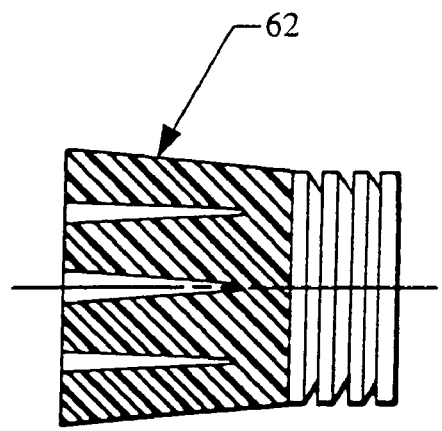
Fig. 7
Fig. 8

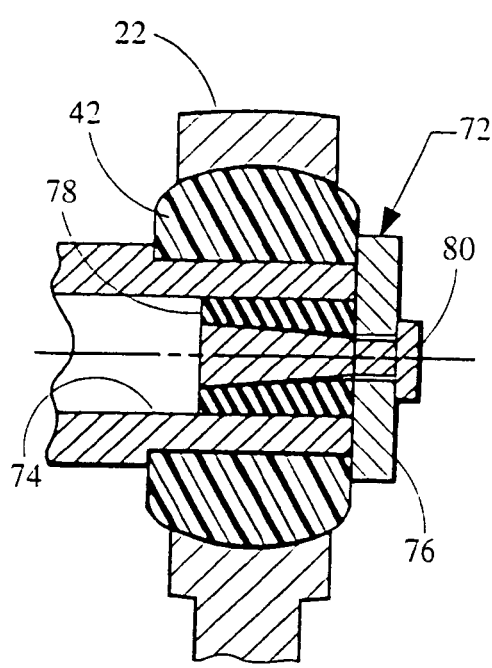
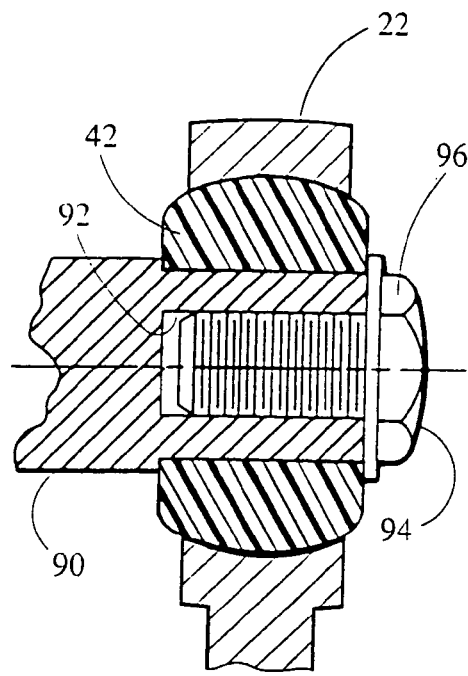
Fig. 9
Fig. 10
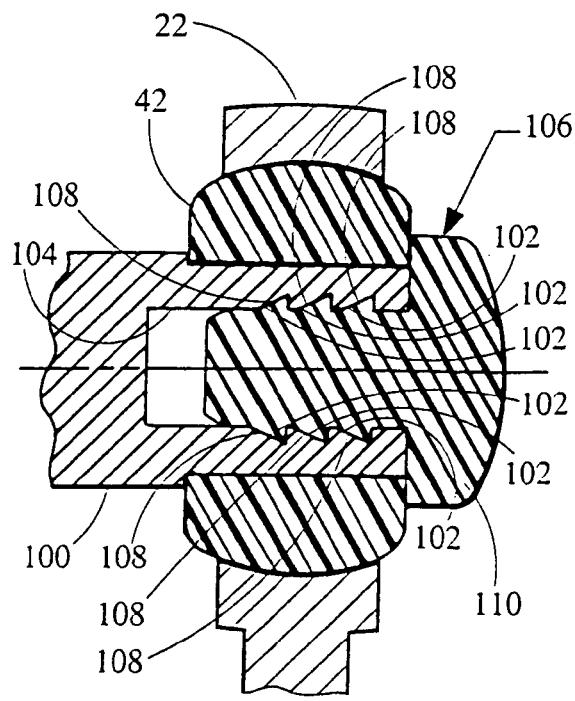
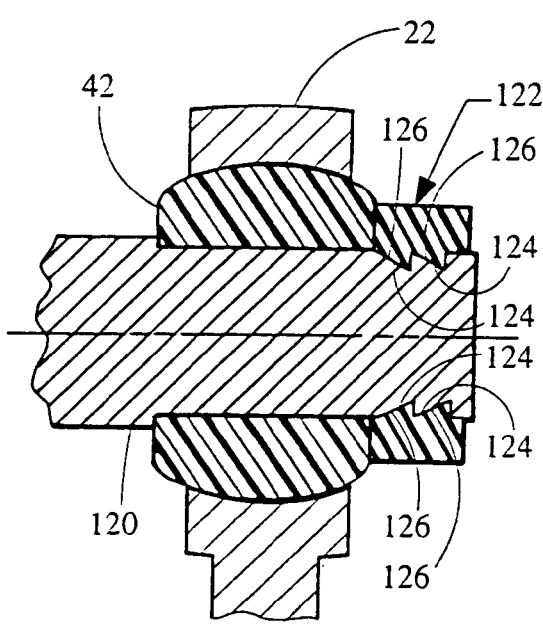
Fig. 11
Fig. 12

STABILIZER BAR INTEGRATED END LINK

TECHNICAL FIELD

The present invention generally relates to a stabilizer bar for an automotive vehicle, and more particularly to an end link that connects the stabilizer bar to other components of the vehicle suspension system.

BACKGROUND

Stabilizer bar systems are designed to provide resistance to roll between the suspension and the body of an automobile during differentiated, or side to side, wheel travel. Typically, the stabilizer bar is connected to the body structure of the vehicle through isolating bushings, and the ends of the stabilizer bar are connected to the suspension of the vehicle through various types of articulating end links. These end links require additional components, such as threaded fasteners, to secure them to the suspension. Methods of connecting the stabilizer bar to other components of the vehicle suspension typically include machined in features and multi-part end link arrangements. Many of these arrangements provide force transfer from the stabilizer bar to the end link only through frictional contact of the sides of the stabilizer bar and the mating surfaces of the end link. Therefore, typical end links require machining of the stabilizer bar and include multiple components of their own, while providing less than optimal force transfer from the stabilizer bar.

As seen from the above discussion, there is a need for a stabilizer bar having an end link that is less complicated, less expensive, and of lighter weight, and that provides more efficient force transfer between the stabilizer bar and end link.

SUMMARY

The disadvantages of prior designs are overcome with the present invention by providing a stabilizer bar that includes an end link achieving direct force transfer from the stabilizer bar to the end link. This is achieved through incorporation of a spherical bearing into the end link.

In another aspect, the end link and the spherical bearing are made from a polymeric material that requires no lubrication.

In still another aspect, the end link is secured to the stabilizer bar by a frictional engagement.

In yet another aspect, the end link is secured to the stabilizer bar by direct a engagement between features formed within the spherical bearing and corresponding features formed within the stabilizer bar.

In still another aspect, the end link is secured to the stabilizer bar by a retainer that secures the spherical bearing on the stabilizer bar.

BRIEF DESCRIPTION OF THE DRAWINGS

FIG. 5 is a sectional view of a portion of a stabilizer bar wherein the end link is secured to the stabilizer bar with a snap ring;

FIG. 6 is a side view of the snap ring shown in FIG. 5;

FIG. 7 is a sectional view of a portion of a stabilizer bar wherein the end link is secured to the stabilizer bar by a compressible collar and nut;

FIG. 8 is a side view of the compressible collar shown in FIG. 7;

FIG. 9 is a sectional view of a portion of a stabilizer bar wherein the end link is secured to the stabilizer bar by an expanding insert;

FIG. 10 is a sectional view of a portion of a stabilizer bar wherein the end link in secured to the stabilizer bar by a threaded fastener;

FIG. 11 is a sectional view of a portion of a stabilizer bar wherein the end link is secured to the stabilizer bar by and end cap inserted within the stabilizer bar;

FIG. 12 is a sectional view of a portion of a stabilizer bar wherein the end link is secured to the stabilizer bar by an end cap engaging the outer surface of the stabilizer bar;

DETAILED DESCRIPTION OF THE PREFERRED EMBODIMENTS

The following description is not intended to limit the scope of the claimed subject matter to the preferred embodiments, but rather to enable any person skilled in the art to make and use the invention.

Figure 1:
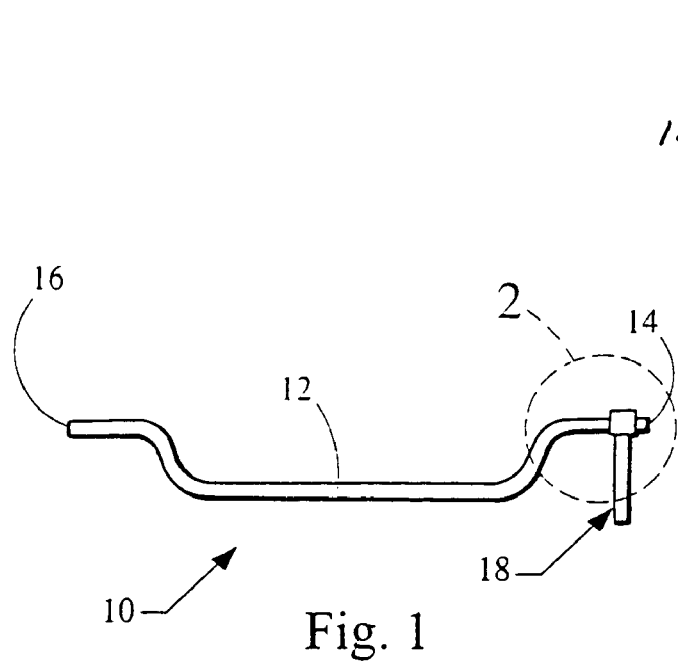
FIG. 1 is a side view of a stabilizer bar having an end link mounted on an end thereof.
Figure 2:
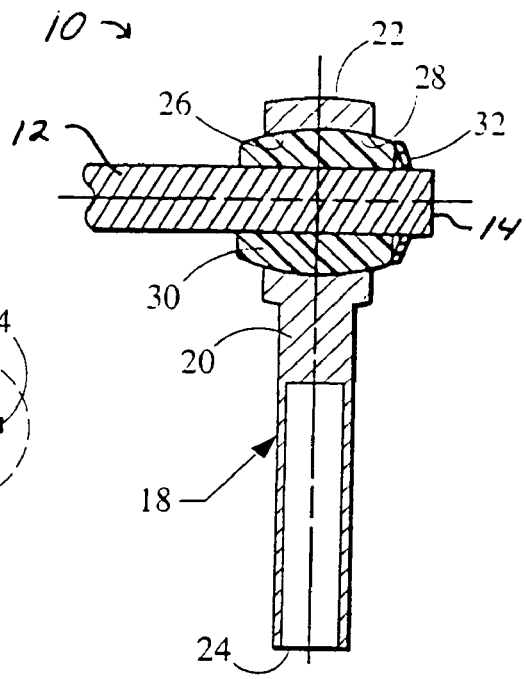
FIG. 2 is a sectional view of a portion of the stabilizer bar enclosed within circle 2 of FIG. 1.

Referring to FIGS. 1 and 2, a stabilizer bar for an automotive vehicle is shown generally at 10. The stabilizer bar 10 includes a body 12 having opposing first and second ends 14, 16. The stabilizer bar 10 further includes an end link 18 mounted to the stabilizer bar 10 adjacent at least one of the first and second ends 14, 16. The end link 18 includes a body portion 20, a first end 22, and a second end 24.

The first end 22 of the end link 18 includes a bore 26 formed therein. The bore 26 defines an inner support surface 28 and receives a spherical bearing 30. The stabilizer bar 10 extends through the spherical bearing 30 such that the end link 18 is supported on the stabilizer bar 10 by the spherical bearing 30 and forces transferred from the stabilizer bar 10 to the end link 18 are transferred through the spherical bearing 30 directly to the inner support surface 28.

The second end 24 of the end link 18 is adapted to connect to a component (not shown) of the suspension system of the automotive vehicle, such as a wheel assembly, or knuckle, a strut, or a control arm.

The end link 18 and the spherical bearing 30 can be made from any suitable material, such as steels, aluminum, or alloys thereof. The end link 18 and the spherical bearing 30 can also be made from polymeric materials, more particularly, engineered plastics, that can withstand high load forces. The use of polymeric materials for the end link 18 and the spherical bearing 30 allows the stabilizer bar 10 to be made lighter, and less expensive. Additionally, the use of polymeric materials, and more specifically, the use of engineered plastics enables the providing of a spherical bearing 30 that does not need lubrication, and will resist corrosion.

Figure 3:
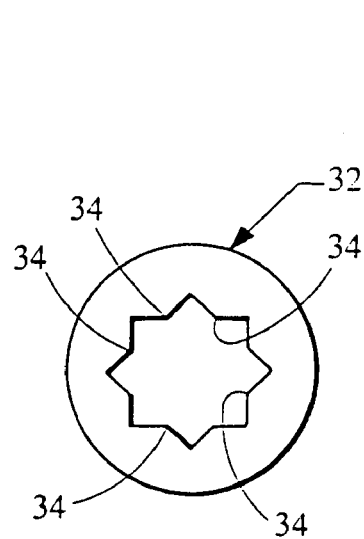
FIG. 3 is an end view of a lock washer as employed in the embodiment of FIG. 2.

The first end 22 of the end link 18 is secured to the stabilizer bar 10 such that the end link 18 cannot slide axially off the end 14 of the stabilizer bar 10. As shown in FIGS. 1, 2, and 3, the first end 22 of the end link 18 is retained onto the end 14 of the stabilizer bar 10 by a lock washer 32. The lock washer 32 may be of any known form and as illustrated includes inwardly extending portions 34 that engage the outer surface of the stabilizer bar 10. Once the lock washer 32 is forced onto the stabilizer bar 10, the lock washer 32 will be frictionally held onto the stabilizer bar 10. By positioning the lock washer 32 between the end link 18 and the end 14 of the stabilizer bar 10, the lock washer 32 prevents the first end 22 of the end link 18 from sliding axially off the stabilizer bar 10.

Figure 4:
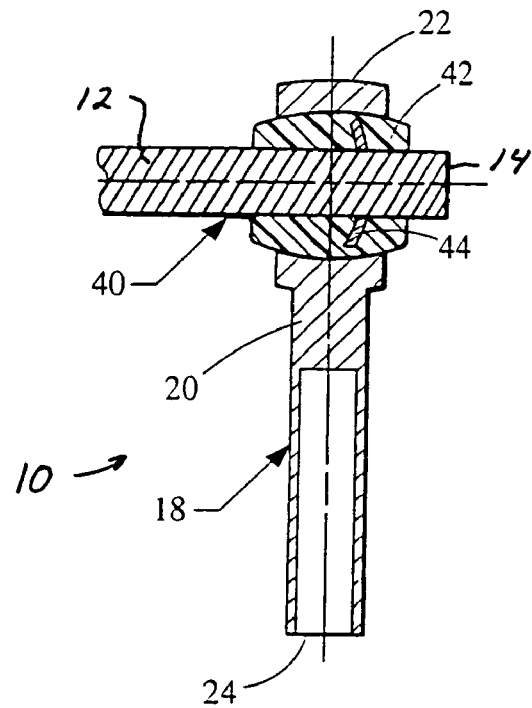
FIG. 4 is a sectional view of a portion of a stabilizer bar wherein the spherical bearing has a lock washer embedded therein.

Alternatively, a lock washer can be embedded within the spherical bearing. Referring to FIG. 4, an end link 18 is shown supported by a spherical bearing 42 on a stabilizer bar 40. A lock washer 44 is embedded within the spherical bearing 42. Once the spherical bearing 42 is placed onto the stabilizer bar 40, the spherical bearing itself is held frictionally onto the stabilizer bar 40, by engagement of the lock washer 44 with the bar 40, thereby securing the end link 18 to the stabilizer bar 40.

An adhesive can be used to further secure the spherical bearing 30 onto the stabilizer bar 12. The adhesive is positioned between the stabilizer bar 12 and the spherical bearing 30. The adhesive can be any appropriate adhesive. With a proper adhesive, the end link 18 could be secured to the stabilizer bar 12 by adhesive alone, thereby eliminating the need for the lock washer 32, 44.

Referring to FIGS. 5 and 6, a stabilizer bar 50 is shown wherein the end link 18 is secured to the stabilizer bar 50 by a clip or snap ring 52. An end of the stabilizer bar 50 includes a groove 54 formed therein extending circumferentially about the stabilizer bar 50. Once the end link 18 is placed on the stabilizer bar 50, a conventional snap ring 52, as shown in FIG. 6, is placed within the groove 54 to secure the end link 18 onto the stabilizer bar 50.

Devices that selectively engage the stabilizer bar can also be used. Referring to FIGS. 7 and 8, a stabilizer bar 60 is shown wherein a compressible collar 62 is used to provide a stop and to secure the spherical bearing 42 of the end link onto the stabilizer bar 60. The collar 62 is slip fit onto the bar 50 and an outer ring or nut 64 threads onto the compressible collar 62 to compress fingers of the compressible collar 62 against the stabilizer bar 60. As the outer ring 64 is further threaded onto the compressible collar 62, the force at which the collar 62 is compressed increases, thereby increasing the frictional force holding the collar 62 onto the stabilizer bar 60.

Referring to FIG. 9, a stabilizer bar 70 that is hollow near the ends is shown. The spherical bearing 42 of the end link is secured to the stabilizer bar 70 by an end cap 72 that selectively expands to engage an inner surface 74 of the hollow stabilizer bar 70. The end cap 72 can be a device such as an expansion bolt or other suitable device. The end cap 72 includes a radially extending flange 76, which provides an axial stop for the spherical bearing 42, and a deformable insert 78. Once the deformable insert 78 is placed within the hollow stabilizer bar 70, a screw 80 is tightened to axially compress the deformable insert 78. Axial compression causes the deformable insert 78 to bulge radially such that the deformable insert 78 engages the inner surface 74 of the hollow stabilizer bar 70 to frictionally secure the end cap 72 to the stabilizer bar 70.

Referring to FIG. 10, a stabilizer bar 90 that is hollow near the ends is shown wherein an inner surface 92 of the hollow portion of the stabilizer bar 90 is provided with threads and a threaded fastener 94 is engaged therewith. A head portion 96 of the threaded fastener 94 provides an axial stop that will prevent the spherical bearing 42 of the end link from sliding axially off the stabilizer bar 90.

Alternatively, instead of threads, a stabilizer bar 100 having hollow ends can include channels 102 extending circumferentially around an inner surface 104. The channels 102 can extend around the entire inner surface 104, or alternatively, the channels 102 can extend partially around the inner surface 104. Referring to FIG. 11, an end cap 106 made of a deformable material includes ridges 108 that extend radially outward and are shaped to correspond with and engage the channels 102 within the stabilizer bar 100. The end cap 106 includes a radially enlarged head 110 to provide a stop for the end link 18. Once the end cap 106 is inserted and the ridges 108 engage the channels 102, the end cap 106 is secured within the stabilizer bar 100 and the spherical bearing 42 of the end link 18 is secured to the stabilizer bar 100.

An alternative means for retaining the end link 18 is shown in FIG. 12, wherein an end cap 122, made of a deformable material, includes ridges 124 extending radially inward that are shaped to engage channels 126 formed on the exterior surface of the end of the stabilizer bar 120. The ridges 124 can extend around the entire end cap 122, or alternatively, the ridges 124 can extend partially around the end cap 122. Once the end cap 122 is placed over the end of the stabilizer bar 120, the ridges 124 of the end cap 122 engage the channels 126 formed within the stabilizer bar 120, and the end cap 122 is secured therein. The end cap 122 is sized so as to axially restrict movement of the spherical bearing 42.

Figure 13:
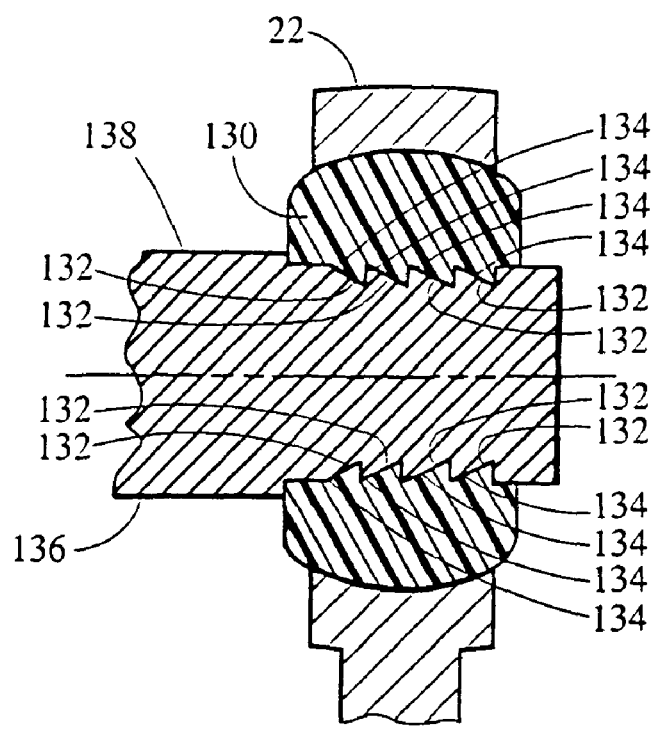
FIG. 13 is a sectional view of a portion of a stabilizer bar wherein the end link is secured to the stabilizer bar by ridges formed within the spherical bearing that engage channels formed on the stabilizer bar.

The use of a spherical bearing made from a polymeric material provides other attachment alternatives because a polymeric spherical bearing 130 is able to deform to some degree, thereby allowing the spherical bearing to be secured to the stabilizer bar without using either an end cap or lock washer. For example, a spherical bearing 130 can include integrally or unitarily formed inwardly extending ridges 132 that engage corresponding channels 134 formed in an outer surface 136 of a stabilizer bar 138, as shown in FIG. 13. The ridges 132 can extend around the entire outer surface 136, or alternatively, the ridges 132 can extend partially around the outer surface 136.

Figure 14:
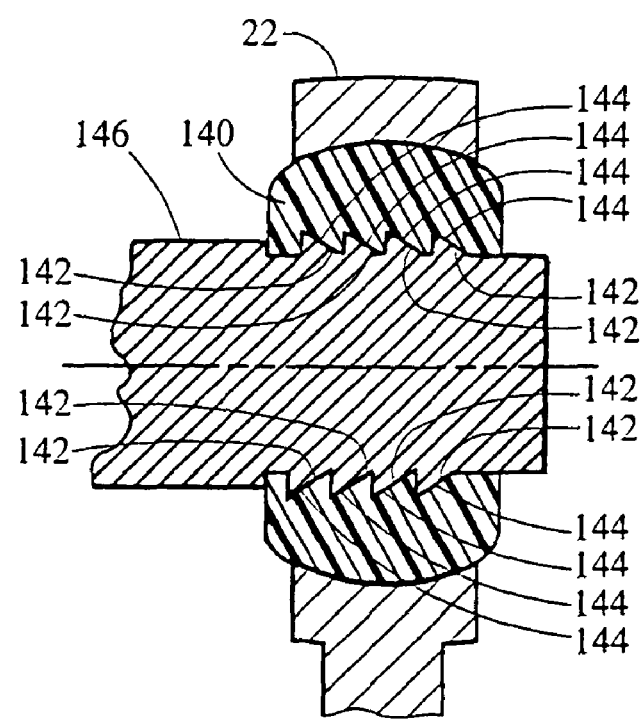
FIG. 14 is a sectional view of a portion of a stabilizer bar wherein the end link is secured to the stabilizer bar by ridges formed within the stabilizer bar that engage channels formed on the spherical bearing.

Alternatively, a spherical bearing 140 can include channels 142 formed therein that engage outwardly extending ridges 144 formed on a stabilizer bar 146, as shown in FIG. 14. The channels 142 can extend around the entire spherical bearing 140, or alternatively, the channels 142 can extend partially around the spherical bearing 140.

In either instance, as the spherical bearing 130, 140 is placed onto the stabilizer bar 138, 146, once the ridges 132, 144 engage the channels 134, 142, the spherical bearing 130, 140 will be axially restrained on the stabilizer bar 138, 146, thereby securing the spherical bearing 130, 140 of the end link in position on the end of the stabilizer bar 138, 146.

Figure 15:
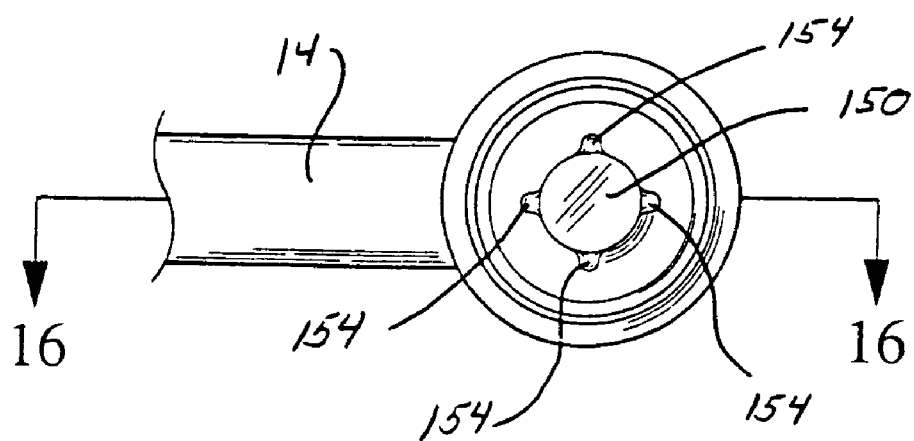
FIG. 15 is an end view of a stabilizer bar wherein the end link in secured thereon by a washer that is spot welded onto the stabilizer bar.
Figure 16:
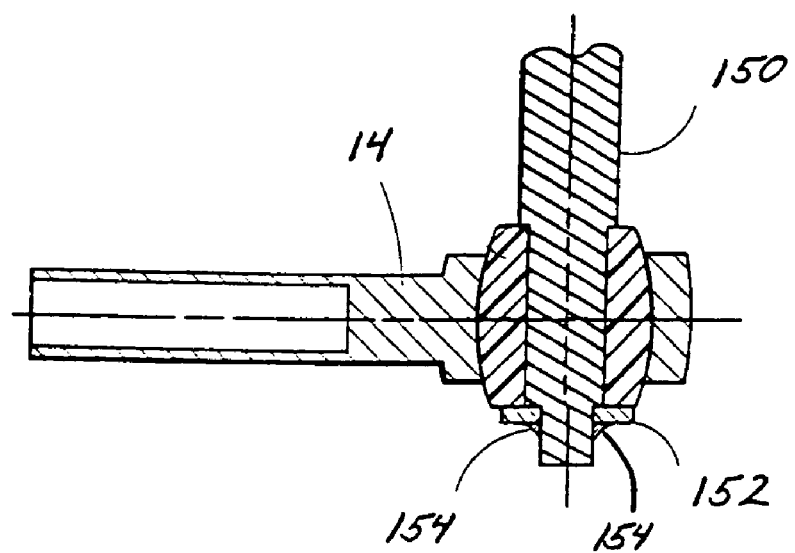
FIG. 16 is a sectional view of the stabilizer bar shown in FIG. 15.

Referring to FIGS. 15 and 16, a stabilizer bar 150 is shown wherein the end link 14 is held onto the stabilizer bar 150 by a washer 152 that is spot welded onto the stabilizer bar 150. Spot welds 154 spaced around the stabilizer bar 150 secure the washer 152 thereon, thereby providing a solid stop against which the end link 18 rests, thereby securing the end link 18 onto the stabilizer bar 150.

The foregoing discussion discloses and describes several embodiments of the invention. One skilled in the art will readily recognize from such discussion, and from the accompanying drawings and claims, that changes and modifications can be made to the invention without departing from the scope of the invention as defined in the following claims. The invention has been described in an illustrative manner, and it is to be understood that the terminology which has been used is intended to be in the nature of words of description rather than of limitation.

We claim:

1. A stabilizer bar for an automotive vehicle comprising:
    a body formed of a first material, extending between first and second ends, a length of the body near at least one of the first end and second end being formed with a circular cylindrical outer surface;
    an end link secured to at least one of said first end and said second end by a lock washer that frictionally engages an outer surface of said body, said end link including a body portion, and a bore including a concave spherical inner support surface that extends transversely through the body portion; and
    a spherical bearing formed from material other than the first material, including a convex spherical outer surface located in the bore and contacting the inner support surface, and a circular cylindrical opening extending through the bearing, the cylindrical outer surface of said length of the body being located in the opening and secured to the end link.

2. The stabilizer bar of claim 1 wherein said lock washer is positioned on said body such that said lock washer is positioned between said end link and an end of said body.

3. The stabilizer bar of claim 1 wherein said stabilizer bar includes a hollow portion near said end of said stabilizer bar and said end link is secured on said stabilizer bar by an end cap positioned within said hollow portion and frictionally engaging an inner surface of said hollow portion.

4. The stabilizer bar of claim 1 wherein said stabilizer bar includes a hollow portion near said end of said stabilizer bar and said end link is secured on said stabilizer bar by an end cap positioned within said hollow portion and mechanically engaging an inner surface of said hollow portion.

5. The stabilizer bar of claim 1 wherein said spherical bearing is formed from a polymeric material.

6. The stabilizer bar of claim 5 wherein said spherical bearing mechanically engages an outer surface of said body.

7. The stabilizer bar of claim 1 wherein said end link is secured to said body by an adhesive disposed between and interconnecting said spherical bearing and an outer surface of said body.

8. A stabilizer bar for an automotive vehicle comprising:
    a body including a first end, a length of the body near the first end being formed with a circular cylindrical outer surface;
    an end link including a body portion, and a bore including a concave spherical inner support surface that extends transversely through the body portion, said end link being secured to said body by a lock washer that frictionally engages an outer surface of said body; and
    a spherical bearing including a convex spherical outer surface located in the bore and contacting the inner support surface, and a circular cylindrical opening extending through the bearing, said length of the body extending through the opening and secured to the end link.

9. The stabilizer bar of claim 8 wherein the circular cylindrical outer surface has a first axis, and the circular cylindrical opening extending through the bearing has a second axis that is substantially coaxial with the first axis.

10. The stabilizer bar of claim 8 wherein said lock washer is positioned on said body such that said lock washer is positioned between said end link and an end of said body.

11. The stabilizer bar of claim 8 wherein said spherical bearing is formed from a polymeric material.

12. The stabilizer bar of claim 8 wherein said end link is secured to said body by an adhesive disposed between and interconnecting said spherical bearing and an outer surface of said body.

* * * * *